Oct. 23, 1928.
H. JASCHUN
1,689,140
FOLDING LICENSE PLATE
Filed Sept. 13, 1927
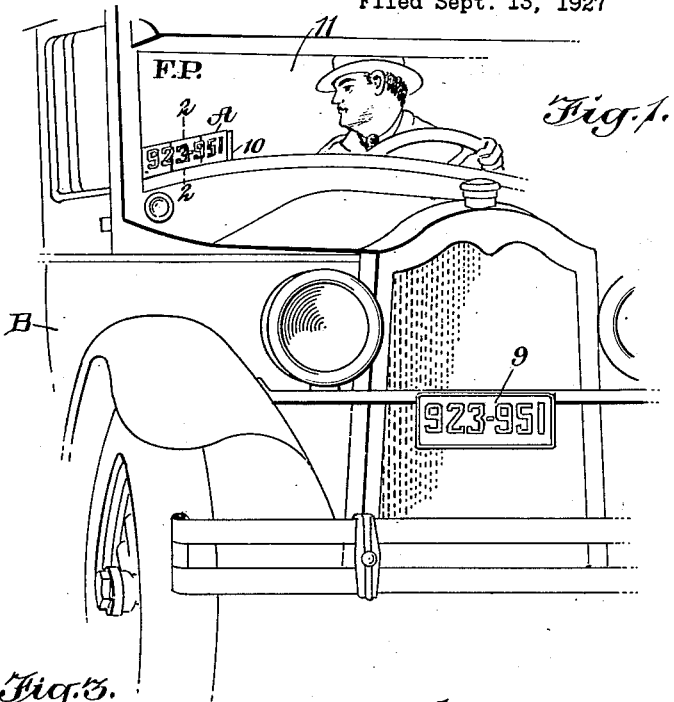
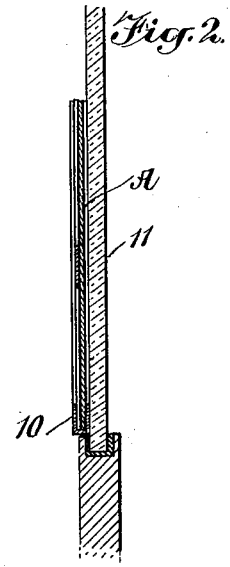
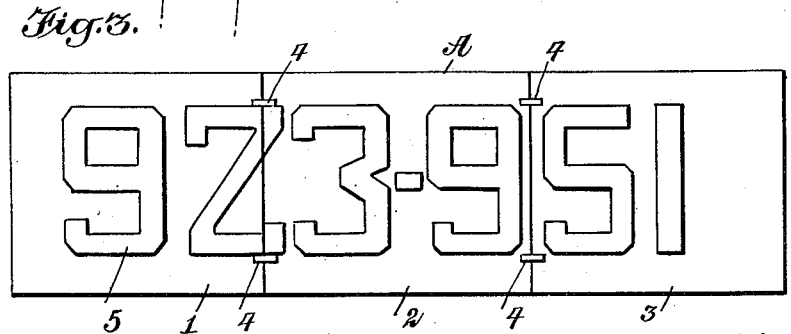
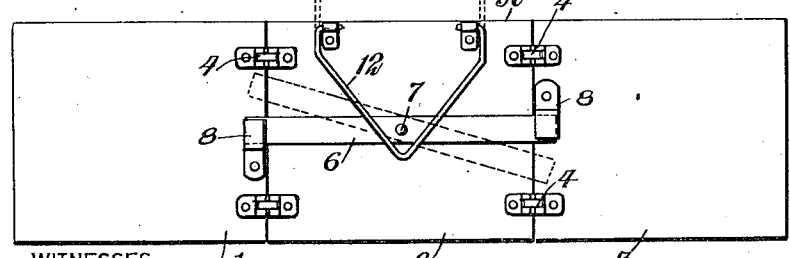
WITNESSES
INVENTOR
HERMAN JASCHUN
BY
ATTORNEY Patented Oct. 23, 1928.

1,689,140

UNITED STATES PATENT OFFICE.

HERMAN JASCHUN, OF BROOKLYN, NEW YORK, ASSIGNOR OF ONE-HALF TO ROBERT WINSTON, OF NEW YORK, N. Y.

FOLDING LICENSE PLATE.

Application filed September 13, 1927. Serial No. 219,294.

This invention relates to folding license plates for automobiles, an object of the invention being to provide a license plate which may be readily removed from the automobile and which may be folded so that it will occupy but a small space and can be slipped into the pocket of the owner while he is passing from the car.

My improved license plate is in the nature of a theft preventing device, as it is to be understood that when the car is operated without the license plate it will be notice to the police and to the public that the car is being driven by an unauthorized operator, and by providing a folding plate which enables the operator to conveniently dispose of the same when he is out of the car I secure a device which is convenient of manipulation and will make a strong appeal to the public.

A further object is to provide a plate of this character, composed of any desired number of sections hingedly connected so that they will fold one against the other and lie flat against each other, which can be rigidly secured in perfect alinement when in position on the car.

My improved license plate may of course constitute one of the regular license plates of the car, but I preferably employ the same as a third license plate and support the same either against the back of the windshield or against some other convenient location where it will not become dirty while driving the car.

With these and other objects in view, the invention consists in certain novel features of construction and combinations and arrangements of parts, which will be more fully hereinafter described and pointed out in the claims.

In the accompanying drawings—

Figure 1 is a perspective view showing my improved folding license plate in operative position on an automobile;

Figure 2 is an enlarged view in section on the line 2—2 of Figure 1;

Figure 3 is a face view of my improved license plate;

Figure 4 is a rear view of the license plate;

Figure 5 is a view in section showing the license plate folded.

It is of course to be understood that I may employ a license plate of any number of sections but I have shown my improved license plate A as having three sections 1, 2 and 3, the intermediate section 2 being connected to the end sections 1 and 3 by link hinges 4 which are located in recesses in the respective plates so as to insure the plates lying in perfect alinement when extended and enabling the sections to be folded one upon the other, as shown in Figure 5, and it will be noted that at least one of these sections is slightly shorter than the other so as not to interfere with the proper folding of the sections.

On the back of the intermediate section 2 of the license plate A I locate a bar 6 which is pivotally supported between its ends as shown at 7, and adapted to engage under angle brackets 8 on the sections 1 and 3 to securely lock the sections in alinement.

It will of course be understood that when this bar is moved to the dotted line position shown in Figure 4 the sections can be moved so that they may fold one upon the other, as shown in Figure 5.

B represents an automobile provided preferably at the front and rear with the ordinary license plates 9. My improved license plate A may of course be located wherever desired on the automobile but I have shown for purposes of illustration the same mounted in a guide frame 10 at the back of the windshield 11 of the automobile, and this guide frame is so constructed as to permit the license plate to be readily slid or otherwise moved into and out of place.

On the windshield 11 adjacent the license plate A I preferably provide the letters "F P" which indicate the words "Folding plate". This is desirable as it enables the policeman to understand that this automobile should have a folding license plate, and if it is in operation without the plate he will know that the car is stolen.

On the back of the intermediate section 2 of the license plate A I provide a folding bail 12 which may be used as a support to suspend the license plate as desired, and while I have illustrated what I believe to be a preferred embodiment of my invention it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A folding license plate, comprising a plurality of sections, link hinges connecting the sections and located in recesses of adjacent sections, and means on the intermediate section for engagement with the end sections to hold the sections in alinement.

2. A folding license plate, comprising three sections, hinges connecting the sections, a bar pivotally connected between its ends to the intermediate section, and members on the end sections engaged by the bar to hold the sections in alinement.

3. A folding license plate, comprising three sections, hinges connecting the sections, a bar pivotally connected between its ends to the intermediate sections, members on the end sections engaged by the bar to hold the sections in alinement, and a bail hingedly connected to the intermediate section.

Signed at New York, in the county of New York and State of New York this 10th day of September, A. D. 1927.

HERMAN JASCHUN.